United States Patent [19]

Kirby

[11] Patent Number: 5,071,312

[45] Date of Patent: Dec. 10, 1991

[54] TURBINES

[76] Inventor: John Kirby, 346A Manchester Old Road, Middleton, Lancashire, M24 4EB, England

[21] Appl. No.: 634,938

[22] Filed: Dec. 28, 1990

Related U.S. Application Data

[63] Continuation of Ser. No. 373,982, Jun. 29, 1989, abandoned.

[30] Foreign Application Priority Data

Jul. 30, 1988 [GB] United Kingdom ............... 8818208

[51] Int. Cl.$^5$ .......................... F01D 1/00; F01D 5/00
[52] U.S. Cl. ..................................... 415/87; 416/192; 29/889.22
[58] Field of Search .................. 415/63, 64, 83, 84, 415/86, 87, 915; 416/189, 192; 29/889, 889.2, 889.21, 889.22, 889.23, 527.3

[56] References Cited

U.S. PATENT DOCUMENTS

| 796,704 | 8/1905 | Clark | 415/87 |
|---|---|---|---|
| 866,958 | 9/1907 | Patschke | 415/87 |
| 1,069,552 | 8/1913 | Johnson | 415/83 |
| 1,076,865 | 10/1913 | Bonom | 415/83 |
| 1,468,555 | 9/1923 | Bonom | 416/126 |
| 1,648,694 | 9/1923 | Bonom | 416/215 |
| 1,910,845 | 5/1933 | Lysholm | 415/86 |
| 1,995,565 | 3/1935 | Coletta | 415/64 |
| 2,021,078 | 11/1935 | Miller | 415/87 |
| 2,344,100 | 3/1944 | Meininghaus | 415/87 |
| 3,053,505 | 9/1962 | Welsh | 416/192 |
| 3,726,619 | 4/1973 | Adams | 415/64 |
| 3,754,839 | 8/1973 | Bodman | 416/195 |
| 4,011,027 | 3/1977 | Selder | 415/83 |
| 4,292,010 | 9/1981 | Meetham et al. | 416/241 R |
| 4,361,414 | 11/1982 | Nemes et al. | 415/83 |
| 4,459,160 | 7/1984 | Meetham et al. | 148/3 |
| 4,564,333 | 1/1986 | Timby et al. | 415/86 |

FOREIGN PATENT DOCUMENTS

| 137586 | 6/1901 | Fed. Rep. of Germany | 415/86 |
|---|---|---|---|
| 622651 | 12/1935 | Fed. Rep. of Germany . | |
| 373003 | 12/1906 | France . | |
| 524173 | 5/1921 | France | 415/87 |
| 250301 | 11/1986 | Japan | 416/192 |
| 223451 | 10/1924 | United Kingdom . | |
| 309124 | 3/1930 | United Kingdom . | |
| 396352 | 8/1933 | United Kingdom . | |
| 403539 | 12/1933 | United Kingdom . | |
| 408529 | 4/1934 | United Kingdom . | |
| 535972 | 4/1941 | United Kingdom . | |
| 545858 | 6/1942 | United Kingdom . | |
| 705130 | 3/1954 | United Kingdom . | |
| 763058 | 12/1956 | United Kingdom . | |
| 802667 | 10/1958 | United Kingdom . | |
| 938123 | 10/1963 | United Kingdom . | |
| 1116430 | 6/1968 | United Kingdom . | |
| 1205632 | 9/1970 | United Kingdom . | |
| 1440610 | 6/1976 | United Kingdom . | |
| 2065237 | 6/1981 | United Kingdom . | |
| 2067672 | 7/1981 | United Kingdom . | |

Primary Examiner—Edward K. Look
Assistant Examiner—Hoang Nguyen
Attorney, Agent, or Firm—Renner, Otto, Boisselle & Sklar

[57] ABSTRACT

A turbine has a rotor which is a disc with blades projecting axially from its face working with stator blades on a disc like stator. Such discs and blades can be cast integrally and if necessary machined flat for good sealing. A plurality of interdigitated stator and rotor discs can be assembled. The rotor can be made of sintered or refractory material and bonded by a hoop of high tensile material to take centrifugal forces enabling low tensile strength material to be used for rotor parts.

30 Claims, 4 Drawing Sheets

TURBINES

This is a continuation of co-pending application Ser. No. 07/373,982 filed on June 29, 1989, now abandoned.

BACKGROUND TO THE INVENTION

This invention relates to turbines. A turbine is, of course, a device for taking power from a working fluid. To the extent to which turbines can also be run as pumps, or compressors, imparting power from an external rotary source to a working fluid, the invention also relates to pumps or compressors. Where reference is made to "turbine" herein, it is to be understood as applying wherever possible to pumps and compressors as well.

There are several recognised types of turbines, amongst which may be mentioned axial flow turbines typified by the turbines of jet aircraft engines and gas turbine and steam power plants driving large electric generators. These axial flow turbines comprise a plurality of discs having radially extending peripheral blades. The blades are attached to the discs in a variety of ways, often having specially shaped blade roots which fit into correspondingly shaped slots in the disc periphery. The blades have to be individually fashioned and fitted and the construction is complicated and expensive and, as a matter of commercial practicality, essentially confined to the high performance uses referred to.

Another type of turbine is the tangential flow turbine which is in essence like a water wheel in which the working fluid is introduced tangentially to impinge upon vanes at the periphery of a rotary disc member.

Either of these types may be a reaction turbine or an impulse turbine, depending on the blade configuration. In an impulse turbine, the working fluid is directed at a rotary blade with the intention to hit it square-on, so to speak, and impart kinetic energy to the blade through the loss of momentum of the working fluid. In a reaction turbine, the blades are fashioned so as to act more like aerofoil sections and increase the speed of the working fluid over the concave face of the blade as compared to the convex face, whereby to generate "lift" in the tangential direction so as to drive the disc member in rotation.

As a practical matter, most turbines operate partly as impulse and partly as reaction turbines, depending on the operating conditions.

The tangential flow turbine, in any event, whilst generally speaking being of less complicated construction than the axial flow turbine, still is a costly machine to engineer, requiring, again, individual blade or vane construction and location.

The present invention provides a turbine that is, by contrast, extremely simple and inexpensive to manufacture.

SUMMARY OF THE INVENTION

The invention comprises a turbine comprising relatively rotatable disc members having an axis of relative rotation and facing each other each disc having blade members arranged in at least one co-axial ring, the blade members of each disc member extending towards the other disc member and axially overlapping the blade members of the other disc member and the rings being of different diameters whereby the blades of one disc member are closely radially spaced from the blades of the other disc member, there being working fluid inlet and outlet means for working fluid flow in a generally radial direction.

One disc member may comprise a stator and the other a rotor.

The working fluid inlet means may comprise an inlet central to one of said disc members, and said one of said disc members having central inlet may constitute a stator.

The turbine may comprise a disc member having blades on both axially-facing faces. It may comprise two relatively rotatable parts at least one of which has blades on oppositely facing faces. At least one of those parts may comprise bladed disc members disposed axially either side of a bladed disc member of the other part. One part may have a plurality of bladed disc members and another part may then have a plurality of bladed disc members interdigitated with those of the first said part. One of such parts may have disc members connected at outer radius by a casing. Said part may then constitute a rotor, and it may have an outer hoop of high tensile material. The other part may constitute a stator.

One of said disc members may be on a shaft, mounted in bearings, the same constituting a rotor.

A rotor may comprise an outer ring of blades.

The blades may be formed as impulse blades or as reaction blades.

The turbine may comprise a disc member having integral blades. The disc member and blades may comprise a casting, or sintered part, or they may comprise a single crystal, for example.

These measures, individually and/or collectively, give rise to a range of possibilities.

Forming the blades integrally with the disc as by casting represents an inexpensive manufacturing method. To improve sealing and reduce leakage it is only necessary to machine axially-facing surfaces of disc and blade tips which in itself is not an expensive procedure. Nor is the provision of annular grooves, which is again a simple machining operation.

Thus a bladed disc can be fashioned without multiple independent blade making and fitting operations—the assembly step is cut right out.

For turbines required to stand high temperatures, it is desirable to use high temperature materials. Unfortunately, for conventional turbine engine design, high temperature e.g. ceramic or refractory materials are strong in compression but not in tension. Otherwise they are ideal for casting or sintering or otherwise forming into an integral blade/disc unit. Conventional turbine rotors, however, impose tensile stresses on blades and discs alike. To meet both temperature and tensile strength requirements, single crystal blades have been developed of exotic materials, which are very expensive, however.

According to one aspect of the present invention, the bladed rotor discs may be connected at outer radius by a casing and have an outer hoop (as by being tightly wound with high tensile wire or strapping or by the casing being of high tensile material or containing high tensile reinforcement) of high tensile material to counter any tendency to fly apart under centrifugal forces. Substantially all internal forces in the disc are then compressive in nature, in regard to which the blade/disc material is strong. This, of course, can also apply to other kinds of turbine, such as axial flow turbines, and will enable low tensile strength ceramic and refractory materials to be used for the blades thereof.

For some aspects of the invention, however, the blades need not be made integral with the discs - they may for example be made separately from the disc members and attached thereto as by welding or, especially with low temperature turbines, by adhesive bonding, or by a mechanical connection, for example, by being lodged in slots or grooves.

The invention also comprises a method of making a turbine having a plurality of interdigitated discs with axially extending blades comprising connecting discs in turn alternately axially to build up one and the other of two relatively rotatable members. A stator shaft can be provided with a first stator disc having blades projecting from each face thereof and a rotor assembled around it, one end disc of said rotor being attached to a bearing on the stator shaft and an intermediate disc of said rotor being disposed against the opposite face the said first stator disc to the end rotor disc and attached to the said end rotor disc at outer radius; then another stator disc is brought up to the intermediate rotor disc and attached to the shaft, and rotor and stator discs assembled thus alternatively until a second end rotor disc finishes off the assembly on a second bearing on the shaft.

BRIEF DESCRIPTION OF THE DRAWINGS

Embodiments of turbines according to the invention will now be described with reference to the accompanying drawings, in which.

DETAILED DISCLOSURE OF THE PREFERRED EMBODIMENT

Figure 1:
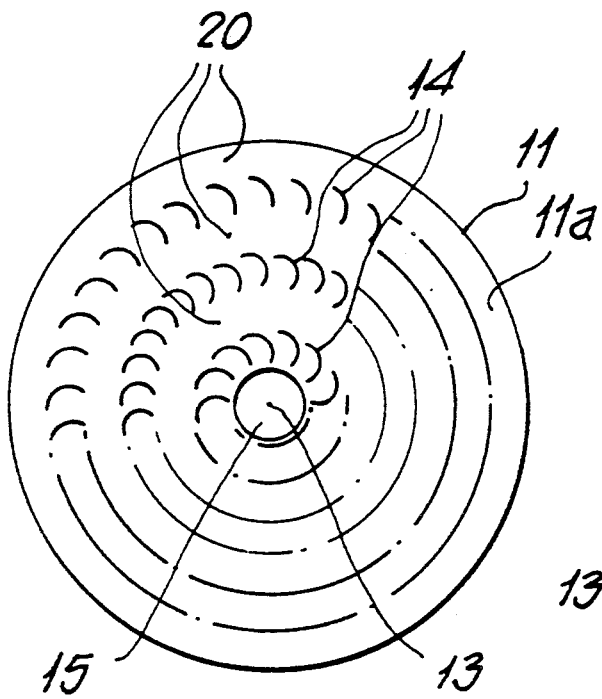
FIG. 1 is an axial view of one disc member of one embodiment.

FIGS. 1 to 10 illustrate turbines comprising relatively rotatable disc members 11, 12 having an axis 13 of relative rotation. In the embodiments specifically described herein, one disc member, 11, comprises a stator, the other, 12, a rotor. It will be appreciated, however that although this arrangement is expected to be the usual arrangement, it could also be arranged that both disc members would rotate, whether at different speeds in the same direction, or at different or equal speeds, but in opposite directions, should this be desired for any reason.

The disc members 11, 12 face each other and have blade members 14 on the facing faces 11a, 12a of the disc members 11, 12, so that the blade members of one disc member extend from that disc member towards the other.

The disc members 11, 12 are so arranged that the blade members 14 of the one axially overlap those of the other. The blade members 14 are arranged in co-axial rings on the disc members 11, 12, the rings being of different diameters whereby the blade members 14 of one disc member are closely radially spaced from those of the other.

A working fluid inlet 15 is provided in the centre of the stator disc member 11. A working fluid outlet 16 is provided by the space between the disc members 11, 12 at the periphery thereof.

The rotor disc member 12, has a shaft 17 which is mounted in bearings 18. An alternator 19 is shown attached to the shaft 17 as an example of a load to be driven by the turbine.

As illustrated, the rotor disc member 12 has an outer ring of blade members 14.

It will be appreciated that the two disc members 11, 12 may be produced as castings, with the blade members 14 cast integrally therewith, thus avoiding the costly separate fabrication and assembly of individual blades of other conventional turbines.

Because the casting operation may leave rough or uneven edges and surfaces, the disc members 11, 12 may need to be finished by machining. This may be required on the end faces 14a, or tips, of the blade members 14 and also on the parts 20 of the opposed disc member against which the faces 14a run. Since the faces 14a all lie in a plane, the machining operation on them is carried out in a single milling operation. Since the faces 20 also all lie in a plane, for either of the disc members 11, 12, likewise a single milling operation could achieve the finishing of all these faces simultaneously.

In fact, with a special tool, machining of both sets of faces 14a and 20 of each disc could be effected in a single milling operation.

It may be, of course, that when working in some materials, e.g. mouldable plastics materials, no finishing operation would be required.

In an alternative method of manufacture, separate blade members may be fashioned and welded to the disc members.

Figure 2:
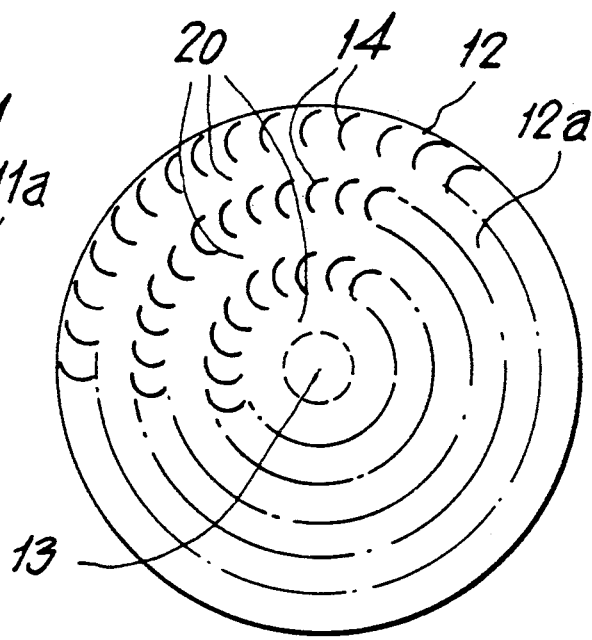
FIG. 2 is an axial view of the other disc member of said one embodiment.
Figure 3:
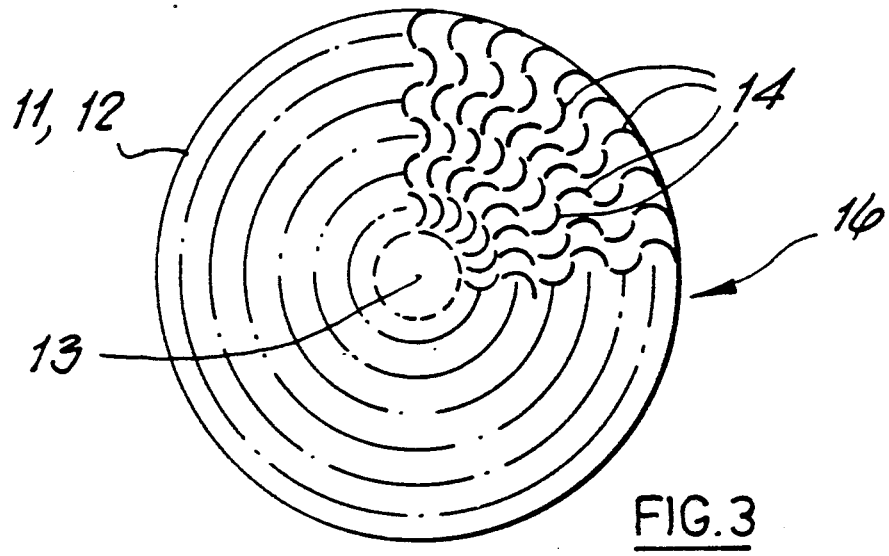
FIG. 3 is a composite axial view showing how the disc members of FIGS. 1 & 2 fit together.
Figure 4:
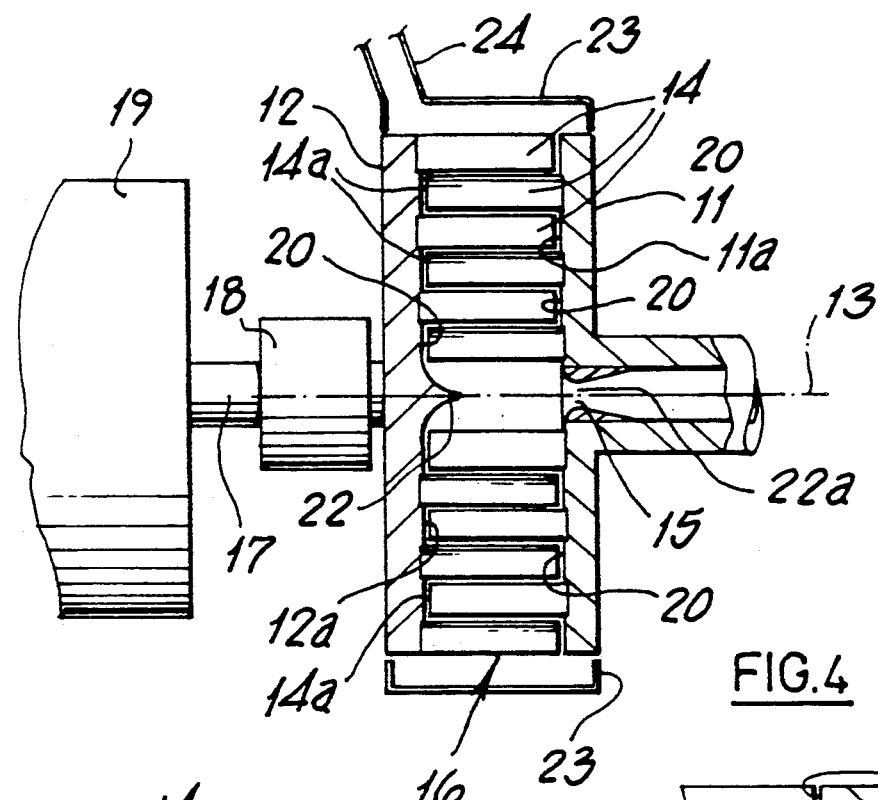
FIG. 4 is an axial section through the embodiment of FIGS. 1 to 3.
Figure 5:
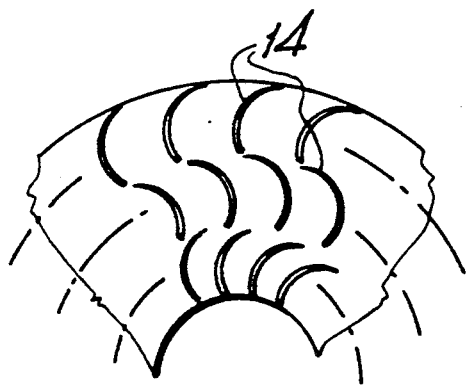
FIG. 5 is an axial view showing a variation of blade configuration.

The blade members 14 illustrated in FIGS. 1 to 3 are formed essentially as impulse blades. FIG. 5 shows a variation in which the blade members 14 ar formed as reaction blades with a more pronounced airfoil section.

Figure 6:
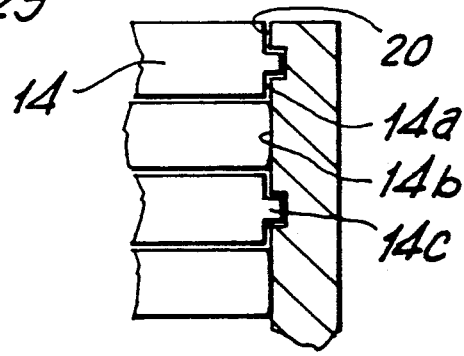
FIG. 6 is a sectional view showing a blade tip sealing arrangement.
Figure 7:
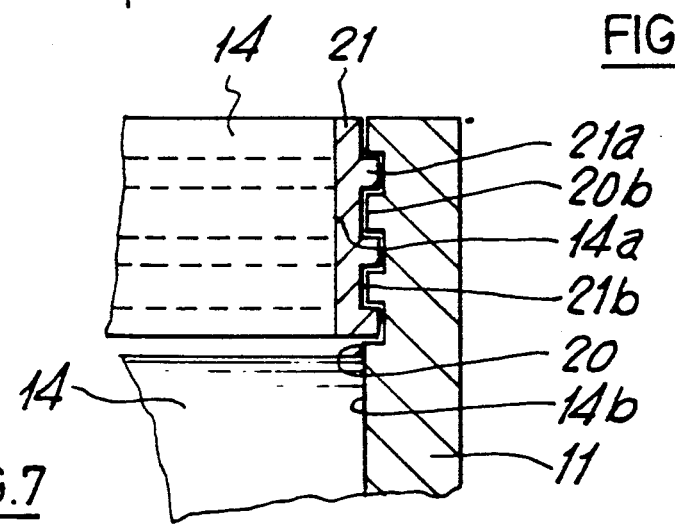
FIG. 7 is a sectional scrap view showing another blade tip sealing arrangement.

FIG. 6 illustrates a blade tip sealing arrangement in which the faces 20 of each of the disc members 11, 12 are recessed below the level of the blade roots 14b in grooves 19a into which fit endwise projections 14c of the blade members 14. This will help reduce leakage of working fluid around the blade tips 14a and improve efficiency. Leakage can be further reduced by attaching annular shrouds 21 (FIG. 7) to the end faces 14a of the blade members 14, the shrouds 21 having lands 21a, and grooves 21b cooperating with grooves 20a and lands 20b of the end faces 20 of the disc members 11, 12.

The rotor 12 has a central profiled, essentially conical deflector member 22 (FIG. 4) opposite the working fluid inlet 15 to deflect the working fluid into the radial direction. The disposition of the deflector member 22 may be important in determining the performance of the turbine arrangement, it may project into a nozzle arrangement 22a at the inlet 15 to achieve optimum fluid velocity at the inlet.

The arrangement may include a casing or housing 23 (FIG. 4) surrounding the disc members 13, 14 and having an exhaust 24 for spent working fluid.

Figure 8:
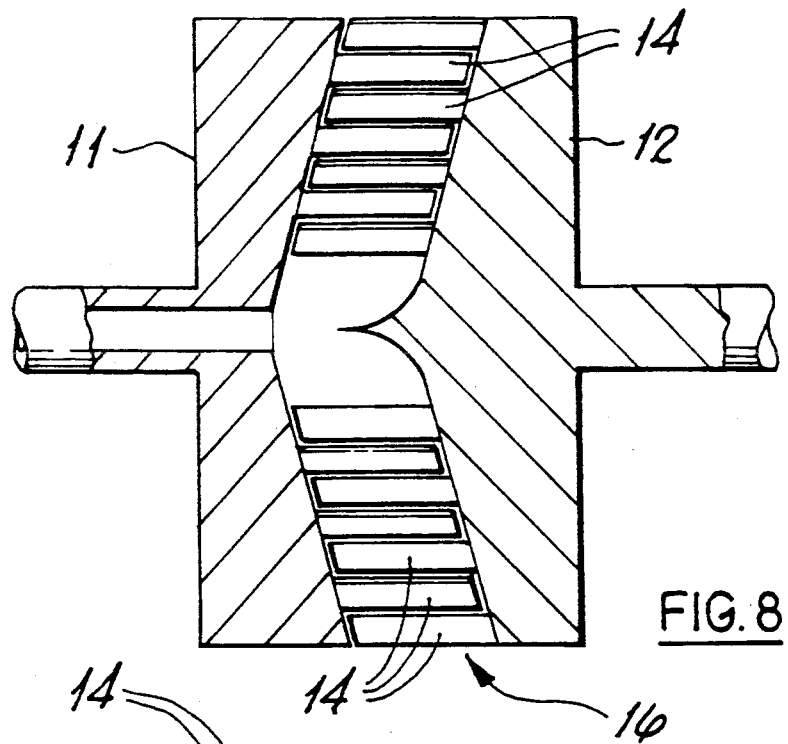
FIG. 8 is an axial section through another embodiment.
Figure 9:
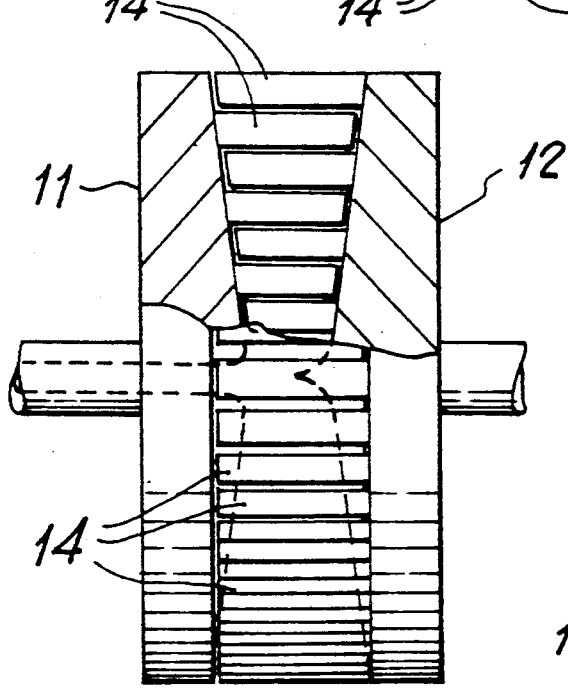
FIG. 9 is a part sectional view of a further embodiment.
Figure 10:
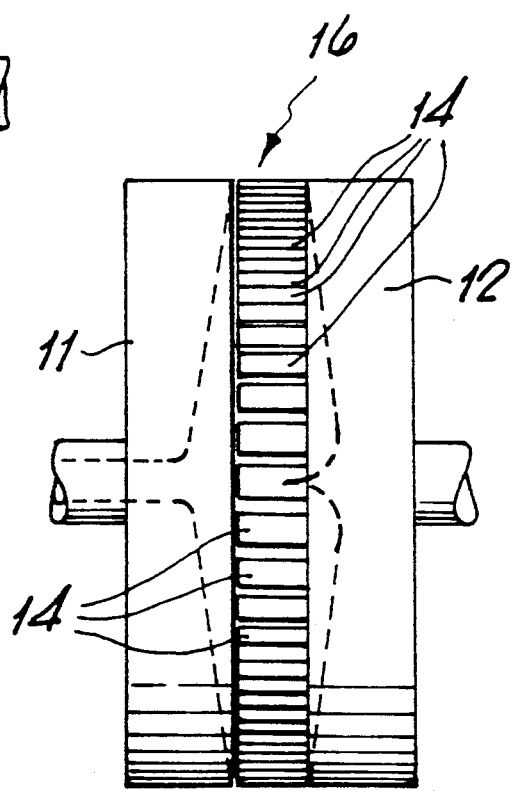
FIG. 10 is a side elevation of a still further embodiment.

The disc members need not, of course, have plane end faces. FIGS. 8, 9 and 10 show possible other configurations. In FIG. 8, the end faces of the disc members 11, 12 are conical, the cone of the rotor 12 fitting with that of the stator 11. FIG. 9 shows an arrangement in which the spacing between the opposed end faces of the disc members 11, 12 increases with increasing radius, while FIG. 10 shows the opposite. The end faces need not, of course, be conical—they may be surfaces of revolution of curves such as circles, hyperbolae or more complicated curves.

Instead of the inlet 15 for the working fluid being central to one part, the stator, of the arrangement, the working fluid could be introduced through the exhaust 24 of the housing 23, and exhaust through the inlet 15.

Moreover, as mentioned above, the turbine could also, given suitable design, function as a pump or compressor.

The turbine can be designed for operation with any desired working fluid such as, for example, steam, compressed air, water or even hot gas as in conventional gas turbines.

The number of rings of blades can be anything from one (essentially on the rotor 12) to ten or even more, although the addition of further rings might improve efficiency only marginally.

Figure 11:
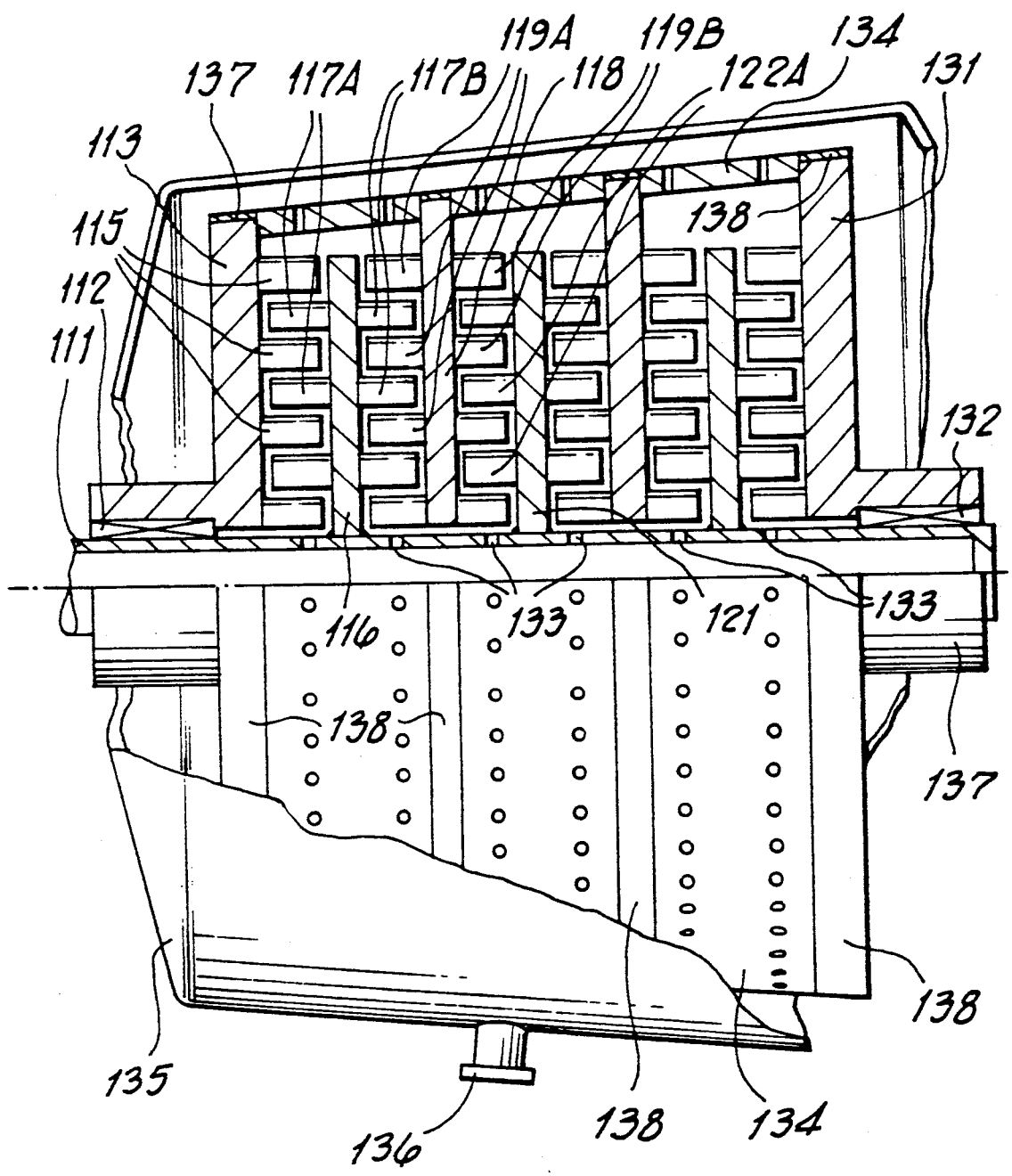
FIG. 11 is a part sectional elevation of a multidisc turbine assembly.

FIG. 11 illustrates a multidisc turbine assembly which is capable of operating at higher power than a single disc arrangement for the same diameter.

On a hollow stator shaft 111 is mounted a bearing and seal arrangement 112 carrying an end disc 13 of a rotor 114. The end disc 113 has axially extending blades 115 in concentric rings as described for the preceding drawings. After mounting this end disc 113, a double-faced stator disc 116 is brought up to it, its blade rings 117A intercalated with the rings of the end rotor disc 113. The stator disc 116 is secured to the stator shaft 111 as by welding. An intermediate rotor disc 118 is now brought up along the stator shaft 111 to the stator disc 116 and located with its blades 119A intercalated with the blades 117B of the double faced disc 116. The disc 118 is secured at outer radius to the disc 113 as by welding or possibly by bolting flanges together.

A further stator disc 121 may now be brought up along the shaft 111 to have its blades 122A intercalated with the blades 119B of the rotor disc 118, and secured to the shaft 111.

As many intermediate rotor discs and stator discs as desired are assembled in this way. Finally, a second end rotor disc 131 is added mounted on a shaft bearing and seal arrangement 132.

The shaft 111 is closed at one end, open at the other for ingress of working fluid, and has apertures 133 for the working fluid to escape to the working region including the rotor and stator blades.

The casing 134 formed by connecting the rotor discs at outer radius is also apertured for the escape of spent working fluid. An outer casing 135 ducts this fluid to an exhaust 136. Power take off is from the hub 137 of the end rotor disc 131.

If the rotor discs are made of cast or sintered material which is strong in compression but not necessarily so in tension, the rotor may be reinforced by rings or hoops of high tensile wire or strip 138. These can be prestressed to counteract centrifugal force whereby the stresses in the rotating discs will all be compressive against the outer rings or hoops 138.

Clearly, other methods of reinforcement can be used as by incorporating reinforcing fibre or filament material into a composite material, as by incorporating carbon or glass fibre in a plastics or resinous material, especially for low temperature operation.

For high temperature operation, refractory materials can be used and especially exotic such materials which can be grown as single crystals, which can be grown in the shape of the rotor or stator disc with integral blades so that even machining can be avoided and certainly assembly of a turbine is made very much easier than when blades have to be assembled to discs.

The integral blade/disc construction however need not be used—it would be quite possible to build a turbine like that illustrated in FIG. 11, for example, by attaching blades to the discs as by welding or by fitting into slots in the discs. The overall turbine configuration might have advantages over conventional turbine types without necessarily resorting to inexpensive constructional methods.

The turbine described and illustrated can be made in various sizes from as small as a few centimeters diameter or less to a meter or more.

I claim:

1. A method of making a turbine having a plurality of interdigitated discs with axially extending blades comprising connecting discs in turn alternately axially to build up one and then the other of two relatively rotatable members by connecting a first stator disc having blades projecting from oppositely facing faces to a stator shaft, assembling a rotor around the first stator disc by attaching one end rotor disc to a bearing on the stator shaft, disposing an intermediate rotor disc against an opposite face of the first stator disc to the end rotor disc, and attaching the intermediate rotor disc to the end rotor disc at an outer radius, then bringing another stator disc up to the intermediate rotor disc and attaching the another stator disc to the stator shaft, and assembling the rotor and stator discs thus alternatively until a second end rotor disc finishes off the assembly on a second bearing on the stator shaft.

2. A method according to claim 1, in which each disc and associated blades comprises a single crystal.

3. A method according to claim 1, in which each of the discs and associated blades are integrally cast.

4. A method according to claim 3, in which each of the rotor discs is bonded by a high tensile hoop at an outer radius.

5. A method according to claim 1, in which each hoop is prestressed to maintain the rotor discs under compression or to prevent them from going under potentially damaging tension.

6. A method according to claim 3, in which the axially facing faces of the blades and discs are machined flat to permit relatively close proximity between the relatively moving parts to avoid leakage of working fluid around the end faces of the blades.

7. A turbine comprising two relatively rotatable parts, relatively rotatable disc members having an axis of relative rotation and facing each other, each disc member having blade members arranged in at least one co-axial ring, the blade members of each disc member extending towards the other disc member and axially overlapping the blade members of the other disc member and the rings being of different diameters whereby the blades of one disc member are closely radially spaced from the blades of the other disc member, there being working fluid inlet and outlet means for working fluid flow in a generally radial direction, at least one of said parts having one of said disc members with blade members on oppositely facing faces, and another of said parts having a plurality of said disc members disposed axially either side of said disc member of said one part, said plurality of said disc members of said one part being connected at an outer radius by a casing.

8. A turbine according to claim 7, in which said one part constitutes a rotor.

9. A turbine according to claim 8, in which said rotor has an outer hoop of high tensile material.

10. A turbine according to claim 8, in which said another part constitutes a stator.

11. A turbine according to claim 7, wherein said disc members are cast disc members, and said blade members of each said disc member are integral cast blade members.

12. A turbine comprising a stator disc and rotor mounted for relative rotation, and relatively rotatable disc members having an axis of relative rotation and facing each other, said relatively rotatable disc members including axially spaced apart end disc members attached to bearings on a stator shaft, and a plurality of interdigitated stator and rotor disc members interposed between said end disc members, said stator disc members being connected to said stator shaft at an inner radius, and said rotor disc members being connected to said end disc members at an outer radius, each said disc member having blade members arranged in at least one co-axial ring, the blade members of each disc member extending towards another disc member and axially overlapping the blade members of another disc member and the rings being of different diameters whereby the blades of one disc member are closely radially spaced from the blades of another disc member, there being working fluid inlet and outlet means for working fluid flow in a generally radial direction.

13. A turbine according to claim 12, wherein said disc members are cast disc members, and said blade members of each said disc member are integral cast blade members.

14. A turbine comprising relatively rotatable disc members having an axis of relative rotation and facing each other, each disc member having blade members arranged in at least one co-axial ring, the blade members of each disc member extending towards the other disc member and axially overlapping the blade members of the other disc member and the rings being of different diameters whereby the blades of one disc member are closely radially spaced from the blades of the other disc member, there being working fluid inlet and outlet means for working fluid flow in a generally radial direction, one of said disc members being on a shaft mounted in bearings and constituting a rotor, said rotor comprising a plurality of said disc members connected to an outer radius by a casing.

15. A turbine according to claim 14, wherein said disc members are cast disc members, and said blade members of each said disc member are integral cast blade members.

16. A turbine according to claim 14, in which another of said disc members is comprised in a stator.

17. A turbine according to claim 16, in which the working fluid inlet means comprise an inlet central to said another disc member.

18. A turbine according to claim 17, in which said another disc member has said blade members on oppositely facing faces.

19. A turbine according to claim 18, in which said blade members on said oppositely facing faces of said another disc member are integral cast blades.

20. A turbine according to claim 14, in which said rotor comprises one part having a plurality of said disc members and another part is provided having a plurality of said disc members interdigitised with said disc members of said one part.

21. A turbine according to claim 14, in which said blade members comprise impulse blades.

22. A turbine according to claim 14, in which said blade members comprise reaction blades.

23. A turbine according to claim 14, in which axially facing faces of said blade members and of the disc members at least at the radius of the or each ring of the blade members of the or an adjacent disc member are machined flat to permit relatively close proximity between the relatively moving members whereby to avoid leakage of working fluid around the end faces of the blade members.

24. A turbine according to claim 14, comprising blade tip seal means.

25. A turbine according to claim 24, in which said tip seal means includes a recess in one of said disc members and an end projection on a blade member of the other of said disc members, said projection fitting endwise into said recess.

26. A turbine according to claim 24, in which said tip seal means includes annular shrouds having lands and grooves in the other of said disc members.

27. A turbine according to claim 14, in which said rotor is cast out of a material which is weak in tension, and said rotor is bonded by high tensile hoop means at an outer radius.

28. A turbine according to claim 27, in which said tensile hoop means is prestressed to maintain said rotor under compression or to prevent said rotor from going under potentially damaging tension.

29. A turbine according to claim 14, in which each said disc member and associated blade members comprise a single crystal.

30. A turbine according to claim 14, in which said rotor has an outer ring of said blade members.

* * * * *